United States Patent
Horng (10) Patent No.: US 9,234,375 B1
(45) Date of Patent: Jan. 12, 2016

(54) HINGE STRUCTURE WITH MALE SHAFT POSITION ADJUSTABILITY

(71) Applicant: Chin-Hsing Horng, Taoyuan (TW)

(72) Inventor: Chin-Hsing Horng, Taoyuan (TW)

( * ) Notice: Subject to any disclaimer, the term of this patent is extended or adjusted under 35 U.S.C. 154(b) by 0 days.

(21) Appl. No.: 14/507,761

(22) Filed: Oct. 6, 2014

(51) Int. Cl.
  *E05D 11/08* (2006.01)
  *E05D 7/10* (2006.01)
  *E05D 5/10* (2006.01)

(52) U.S. Cl.
  CPC .................................... *E05D 11/082* (2013.01)

(58) Field of Classification Search
  CPC ............... Y10T 16/54038; Y10T 16/5403; Y10T 16/536; Y10T 16/53605; Y10T 16/53607; Y10T 16/536075; Y10T 16/53608; Y10T 16/5362; Y10T 16/527; Y10T 16/5275; Y10T 16/528; Y10T 16/557; Y10T 16/54025; E05D 11/08; E05D 11/081; E05D 11/087; E05D 11/084; E05D 11/105; E05D 2011/1035; E05D 5/10; E05D 7/10; E05D 7/1005; E05D 7/1044; E05D 15/502; E05D 15/505; E05D 15/507; E05Y 2400/606; G05F 1/1681; G05F 1/1616
  See application file for complete search history.

(56) References Cited

U.S. PATENT DOCUMENTS

| | | | | | |
|---|---|---|---|---|---|
| 1,120,521 | A | * | 12/1914 | Oborny | E05B 65/0864 292/61 |
| 1,714,196 | A | * | 5/1929 | Vara | E05B 65/0864 292/60 |
| 2,369,148 | A | * | 2/1945 | Langhorst | E05D 7/1005 16/229 |
| 2,427,922 | A | * | 9/1947 | Raymond | G01N 21/5907 16/256 |
| 2,778,053 | A | * | 1/1957 | Hess | E05D 7/1061 16/258 |
| 3,766,599 | A | * | 10/1973 | Ullman, Jr. | E05D 7/1022 16/257 |
| 4,165,854 | A | * | 8/1979 | Duly | A47C 3/34 248/245 |
| 4,367,567 | A | * | 1/1983 | Sendoykas | A47K 13/12 16/263 |
| 4,455,711 | A | * | 6/1984 | Anderson | E05D 7/1011 16/229 |
| 4,620,392 | A | * | 11/1986 | Kerpers | E05D 7/1011 16/229 |
| 4,635,327 | A | * | 1/1987 | Netznik | F16B 1/00 24/653 |
| 4,997,218 | A | * | 3/1991 | Culling | E05B 63/125 292/302 |
| 5,040,268 | A | * | 8/1991 | Knurr | E05D 5/10 16/261 |
| 5,206,790 | A | * | 4/1993 | Thomas | F16M 11/10 16/342 |
| 5,263,227 | A | * | 11/1993 | Hrbek | E05D 5/121 16/224 |
| 5,280,973 | A | * | 1/1994 | Culling | E05B 17/0025 292/342 |
| 5,715,576 | A | * | 2/1998 | Liu | G06F 1/1616 16/303 |
| 5,845,366 | A | * | 12/1998 | Kuroda | G06F 1/1626 16/229 |

(Continued)

FOREIGN PATENT DOCUMENTS

DE  3401253 A1 * 7/1985 ............. E05D 5/121
FR  2880379 A1 * 7/2006

(Continued)

*Primary Examiner* — Chuck Mah (57) ABSTRACT

A hinge structure having the characteristics of space-saving and ease of installation is disclosed to include a mounting base member affixed to a base member of a low profile flip-up electronic product, female hinge shafts fixedly mounted in the mounting base member, a male hinge shaft affixed to a cover member of the flip-up electronic product and rotatably and axially movably inserted through the female hinge shafts, and a rotary knob coupled with one end of the male hinge shaft and rotatable to move the male hinge shaft axially relative to the female hinge shafts and the mounting base member.

8 Claims, 11 Drawing Sheets

(56) References Cited

U.S. PATENT DOCUMENTS

| | | | | |
|---|---|---|---|---|
| 6,119,307 | A | * | 9/2000 | Weishar .................. E06B 3/485 16/106 |
| 6,301,748 | B1 | * | 10/2001 | Su-Man ................ G06F 1/1616 16/337 |
| 6,655,720 | B2 | * | 12/2003 | Rampen .............. E05B 65/0876 292/163 |
| 8,732,906 | B1 | * | 5/2014 | Van Gennep ....... E05D 11/1007 16/229 |
| 2006/0032022 | A1 | * | 2/2006 | Minami ................ E05D 11/087 16/342 |
| 2007/0169314 | A1 | * | 7/2007 | Lee ....................... G06F 1/1681 16/342 |
| 2009/0193623 | A1 | * | 8/2009 | Balbo Di Vinadio ..... E05D 5/10 16/381 |
| 2010/0101054 | A1 | * | 4/2010 | Cook ........................ E05D 5/02 16/382 |
| 2010/0175221 | A1 | * | 7/2010 | Klassen ................ E05D 7/1005 16/229 |
| 2011/0173775 | A1 | * | 7/2011 | Chen ..................... G06F 1/1681 16/335 |
| 2013/0081331 | A1 | * | 4/2013 | Vullings .................... E06B 3/32 49/388 |
| 2013/0180177 | A1 | * | 7/2013 | Lazarevich ........... E05D 7/1005 49/399 |

FOREIGN PATENT DOCUMENTS

| | | | | |
|---|---|---|---|---|
| GB | 2197385 | A | * 5/1988 | .............. E05D 7/105 |
| WO | WO 0116450 | A1 | * 3/2001 | ............ E05D 7/1011 |

* cited by examiner

HINGE STRUCTURE WITH MALE SHAFT POSITION ADJUSTABILITY

BACKGROUND OF THE INVENTION

1. Field of the Invention

The present invention relates to hinge technology and more particularly, to a hinge structure for use in a flip-up electronic product that allows adjustment of the position of the male hinge shaft relative to the female hinge shafts.

2. Description of the Related Art

Hinges are intensively used in flip-up mobile electronic devices, such as notebook, electronic dictionary, PDA and etc. to pivotally connect a base member and a cover member together, allowing only a limited angle of rotation between them.

A conventional hinge structure for flip-up electronic product generally comprises a female hinge shaft having a mounting leaf for fixation to a cover member of a flip-up electronic product, and a male hinge shaft rotatably inserted through the female hinge shaft and having a mounting leaf for fixation to a base member of the flip-up electronic product for allowing the cover member of the flip-up electronic product to be turned relative to the base member between an open position and a close position. However, this conventional design of hinge structure still has drawbacks as follows:

1. The cover member and base member of the flip-up electronic product must provide a respective mounting leaf for mounting. It is complicated to respectively fasten the mounting leaf of the male hinge shaft and the mounting leaf of the female hinge shaft to the cover member and base member of the flip-up electronic product with screws.

2. Today's electronic products are facing light, thin, short and small design. The mounting leaf of the male hinge shaft and the mounting leaf of the female hinge shaft occupy much space in the cover member and base member of the flip-up electronic product, minimizing available internal space of the flip-up electronic product, not facilitating small size design.

SUMMARY OF THE INVENTION

The present invention has been accomplished under the circumstances in view. It is therefore the main object of the present invention to provide a hinge structure with male shaft position adjustability, which is practical for use in a flip-up electronic product, requiring less installation space in the flip-up electronic product and simplifying the installation of the flip-up electronic product.

To achieve this and other objects of the present invention, a hinge structure comprises a mounting base member, which comprises a base wall, an upright wall vertically upwardly extended from a top surface of said base wall and a screw hole located in the upright wall, a rotary knob threaded into the screw hole, a plurality of female hinge shafts fixedly mounted at the top surface of the base wall and surrounded by the upright wall, and a male hinge shaft rotatably inserted through the female hinge shafts. The male hinge shaft comprises a cylindrical shaft body rotatably inserted through each female hinge shaft, a connection portion located at one end of the cylindrical shaft body and disposed adjacent to the upright wall. The rotary knob comprises a threaded shank threaded into the screw hole, an actuation portion located at one end of the threaded shank and coupled to the connection portion of the male hinge shaft in such a manner that rotating the rotary knob to move the threaded shank in direction toward or away from the mounting base member causes the male hinge shaft to be moved axially in one of two reversed directions.

DETAILED DESCRIPTION OF THE PREFERRED EMBODIMENT

Figure 1:
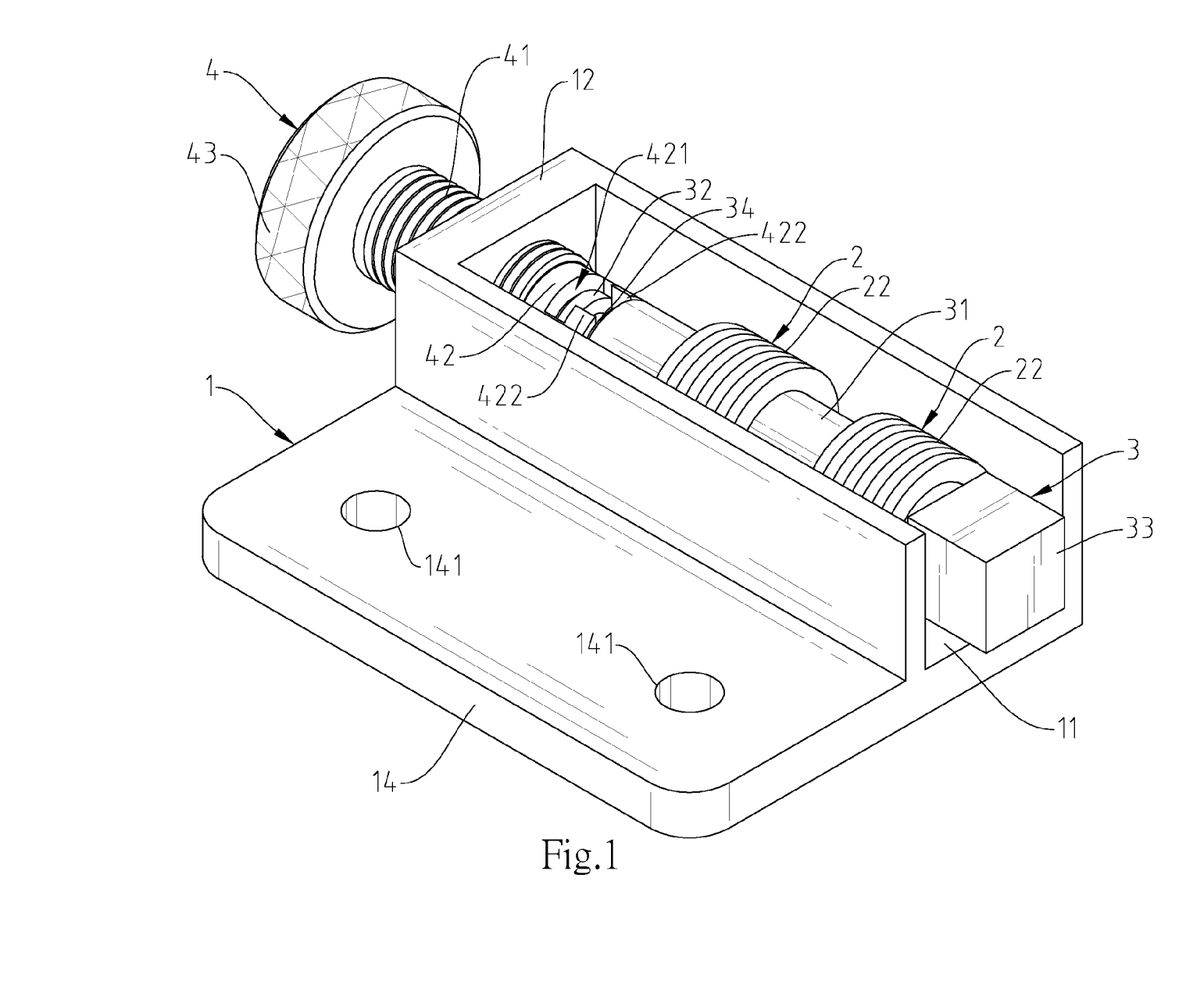
FIG. 1 is an oblique top elevational view of a hinge structure in accordance with a first embodiment of the present invention.
Figure 2:
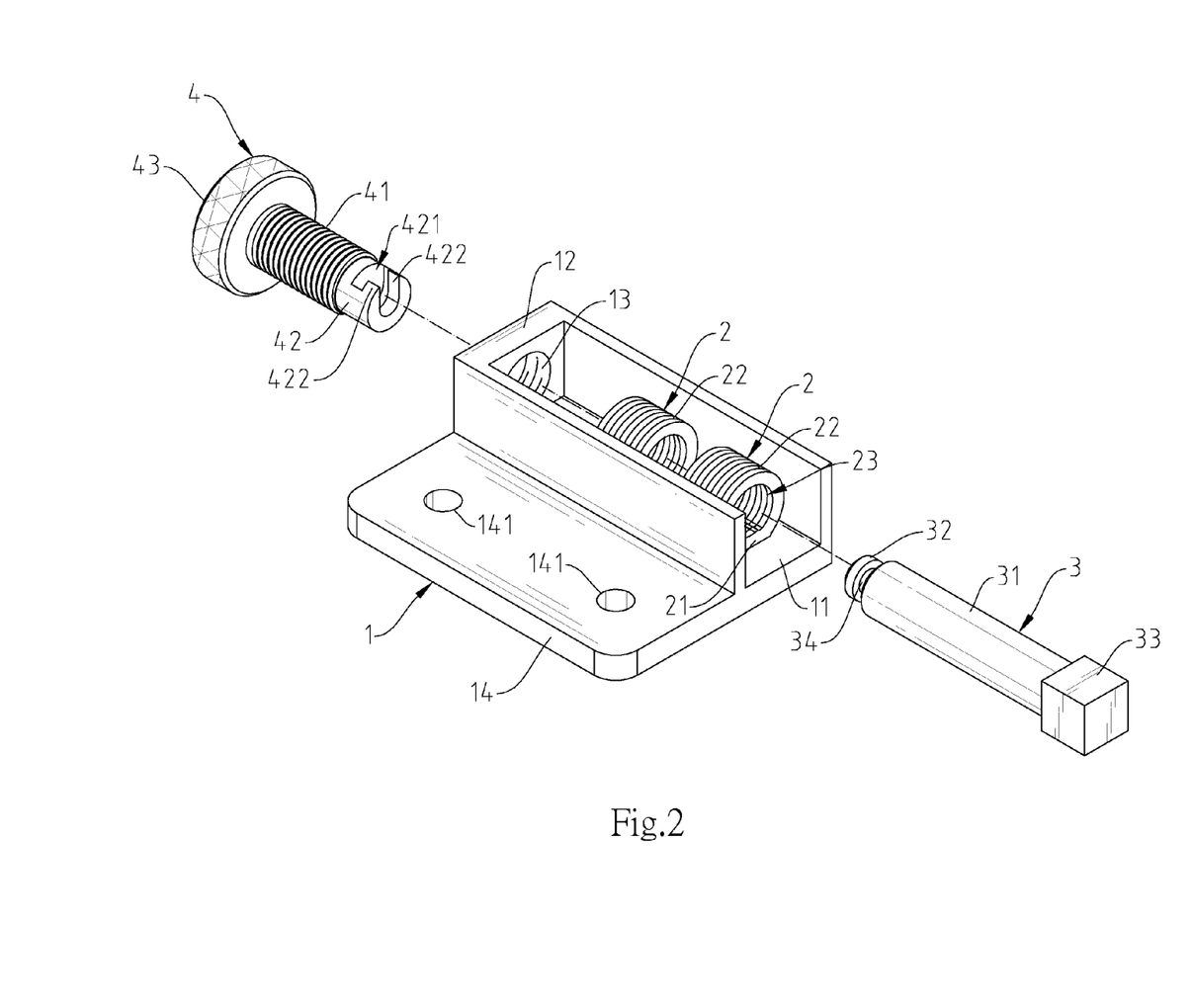
FIG. 2 is an exploded view of the hinge structure in accordance with the first embodiment of the present invention.
Figure 3:
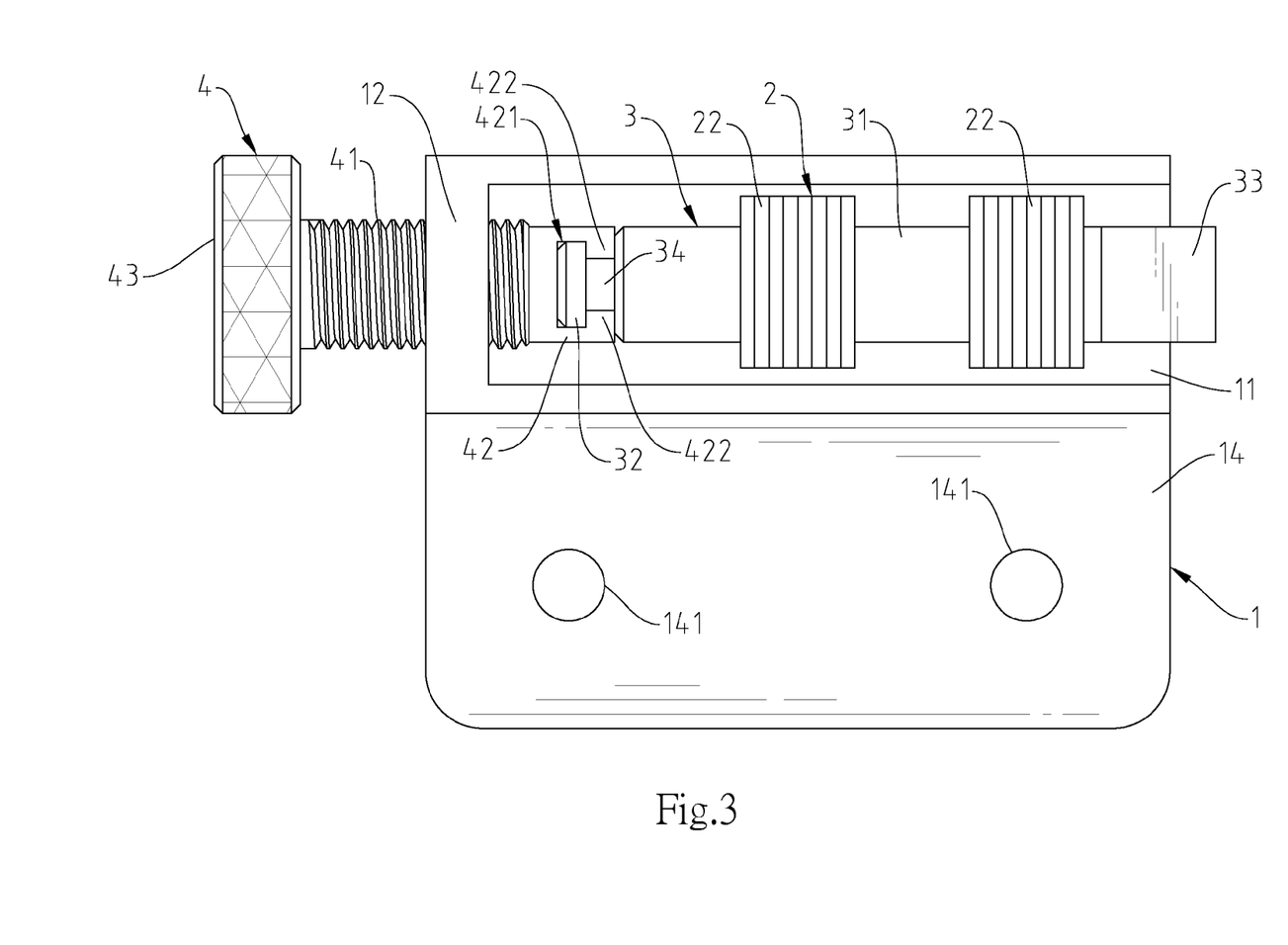
FIG. 3 is a sectional view of the hinge structure in accordance with the first embodiment of the present invention.

Referring to FIGS. 1-3, a hinge structure in accordance with a first embodiment of the present invention is shown. The hinge structure comprises a mounting base member 1, a plurality of female hinge shafts 2, a male hinge shaft 3, and a rotary knob 4.

The mounting base member 1 comprises a horizontal base wall 11, an upright wall 12 vertically upwardly extended from a top surface of the base wall 11, a screw hole 13 horizontally located in the upright wall 12, a mounting wall 14 horizontally extended from one lateral side of the base wall 11 in a flush manner, and a plurality of mounting through hole 141 cut through opposing top and bottom surfaces of the mounting wall 14.

The female hinge shafts 2 are mounted on the top surface of the base wall 11 and surrounded by the mounting base member 1.

Each female hinge shaft 2 comprises a tubular shaft body 22 defining therein an axially extending shaft chamber 23, and a positioning portion 21 formed integral with the periphery of the tubular shaft body 22 and fixedly mounted at the top surface of the base wall 11.

The male hinge shaft 3 comprises a cylindrical shaft body 31 inserted through the shaft chamber 23 of each female hinge shaft 2, a mounting portion 33 located at one end of the cylindrical shaft body 31 and disposed outside the mounting base member 1, a connection portion 32 located at an opposite end of the cylindrical shaft body 31 and disposed adjacent to one end of the upright wall 12, and a position-limit groove 34 extending around the periphery thereof between the cylindrical shaft body 31 and the connection portion 32. After installation of the male hinge shaft 3 in the female hinge shafts 2, the mounting portion 33 is disposed at one side relative to the female hinge shafts 2, the connection portion 32 and position-limit groove 34 are disposed at an opposite side relative to the female hinge shafts 2.

The rotary knob 4 comprises a threaded shank 41 threaded into the screw hole 13 of the mounting base member 1, an actuation portion 42 located at one end of the threaded shank 41, an operating head 43 located at an opposite end of the threaded shank 41 and coupled to the connection portion 32 of the male hinge shaft 3, a receiving trough 421 defined in the actuation portion 42 and adapted for receiving the connection portion 32 of the male hinge shaft 3, and a protruding portion 422 formed integral with one end of the actuation portion 42 remote from the threaded shank 41 and coupled to the position-limit groove 34 of the male hinge shaft 3.

Figure 4:
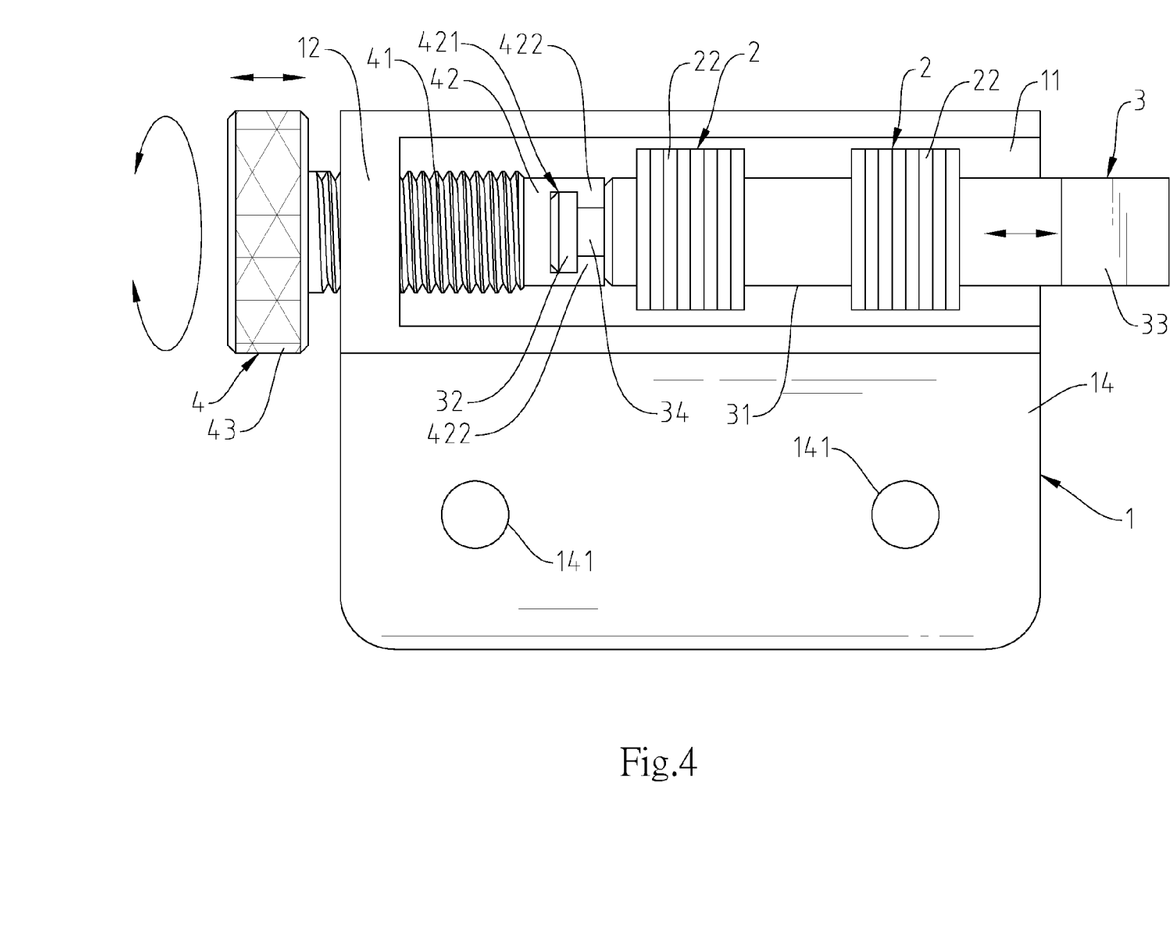
FIG. 4 is an operational view of the first embodiment of the present invention, illustrating the rotary knob rotated, the male hinge shaft moved axially relative to the female hinge shafts and the mounting base member.

Referring to FIG. 4 and FIGS. 2 and 3 again, in application, as illustrated, the user can operate the operating head 43 of the rotary knob 4 to rotate the threaded shank 41, moving the threaded shank 41 in direction toward or away from the mounting base member 1. When moving the threaded shank 41 in direction toward or away from the mounting base member 1, the actuation portion 42 of the rotary knob 4 will be forced to drive the connection portion 32 of the male hinge shaft 3, moving the male hinge shaft 3 in direction toward or away from the mounting base member 1.

Figure 5:
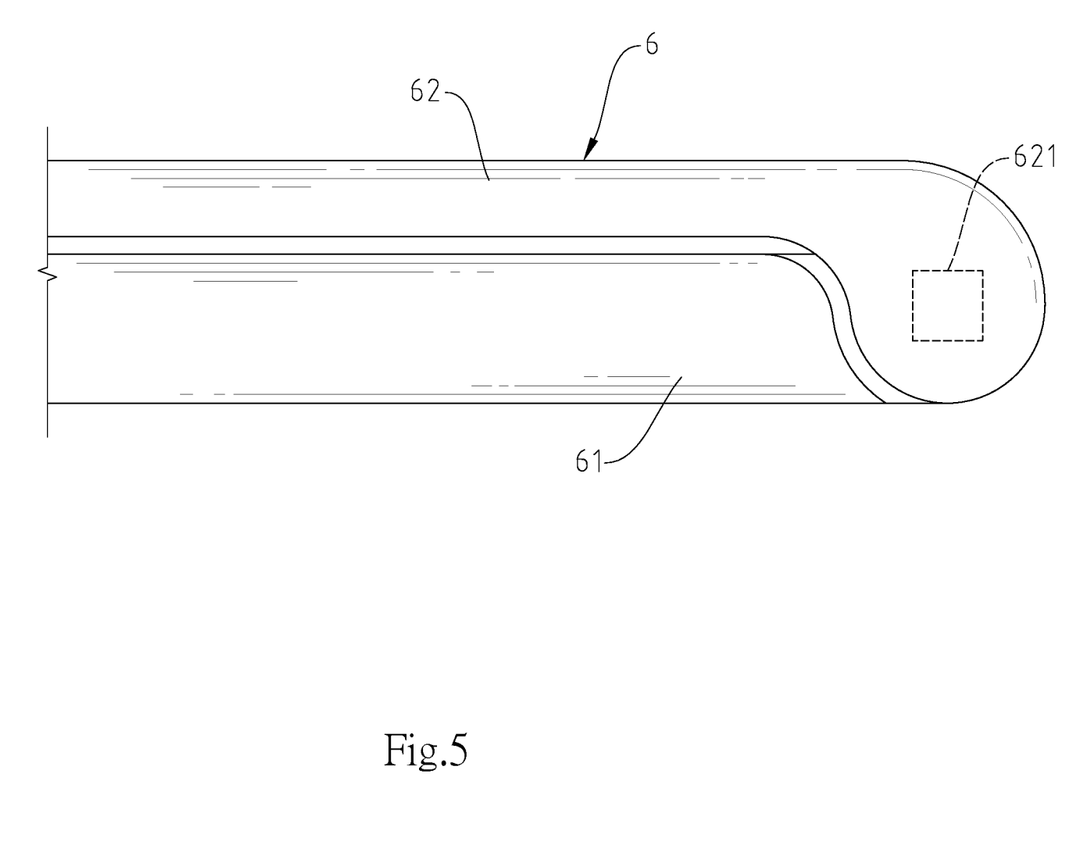
FIG. 5 is a schematic side view illustrating the hinge structure of the first embodiment of the present invention used in a flip-up electronic product.
Figure 6:
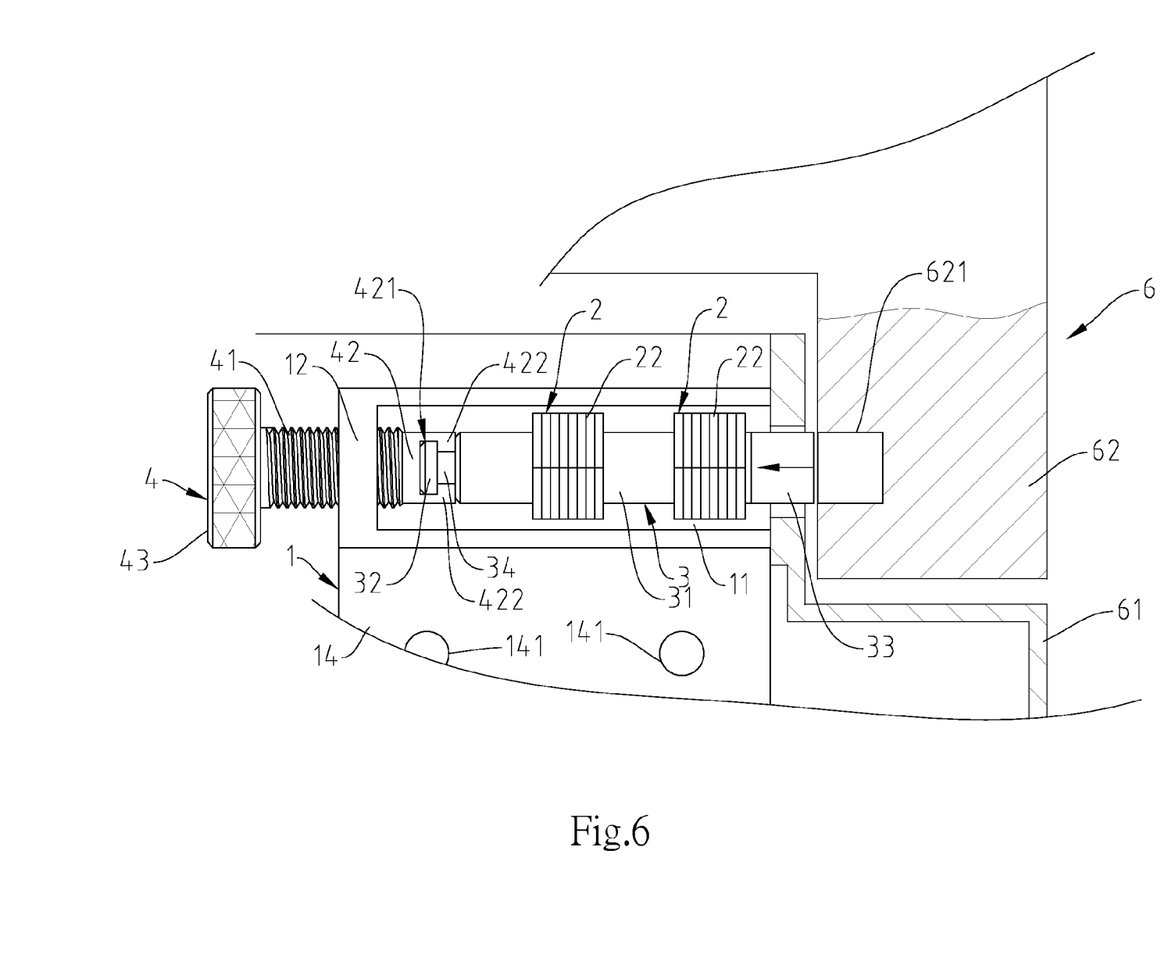
FIG. 6 is a schematic applied view of the first embodiment of the present invention, illustrating an operation status of the hinge structure in the flip-up electronic device (I).
Figure 7:
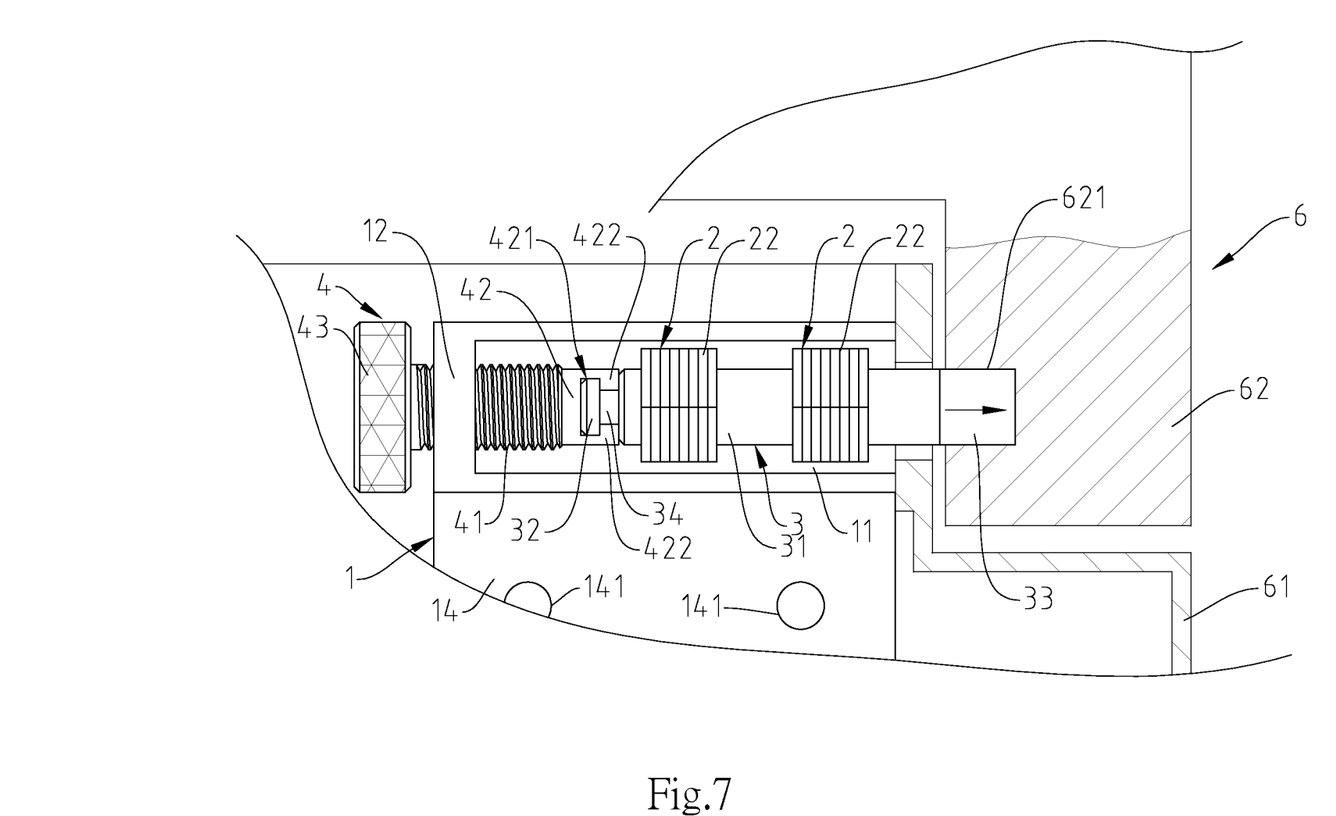
FIG. 7 is a schematic applied view of the first embodiment of the present invention, illustrating an operation status of the hinge structure in the flip-up electronic device (II).

Referring to FIGS. 5-7 and FIGS. 2-4 again, the mounting through holes 141 of the mounting wall 14 of the mounting base member 1 are affixed to a base member 61 of a flip-up electronic product 6. After affixed the mounting wall 14 of the mounting base member 1 to the base member 61 of the flip-up electronic product 6, rotate the operating head 43 to move the rotary knob 4 in direction away from the mounting base member 1, causing the actuation portion 42 to carry the connection portion 32 of the male hinge shaft 3 toward the mounting base member 1. Thereafter, turn the cover member 62 of the flip-up electronic product 6 toward the base member 61 to the position where a locating hole 621 in the cover member 62 is kept in axial alignment with the mounting portion 33 of the male hinge shaft 3. At this time, rotate the operating head 43 to move the rotary knob 4 toward the inside of the mounting base member 1, causing the actuation portion 42 to push the connection portion 32 of the male hinge shaft 3 in direction away from the mounting base member 1 and to further force the mounting portion 33 of the male hinge shaft 3 into the locating hole 621 in the cover member 62. Because the mounting portion 33 of the male hinge shaft 3 and the locating hole 621 of the cover member 62 are non circular, the male hinge shaft 3 can be turned with the cover member 62 relative to the female hinge shafts 2 and mounting base member 1 of the hinge structure and the base member 61 of the flip-up electronic product 6 after engaged the mounting portion 33 into the locating hole 621 of the cover member 62. Similarly, when the user wishes to dismount the cover member 62 and base member 61 of the flip-up electronic product 6, the user simply needs to rotate the operating head 43 in moving the rotary knob 4 in direction away from the mounting base member 1, enabling the connection portion 32 of the male hinge shaft 3 to be driven by the actuation portion 42 of the rotary knob 4 to disengage the mounting portion 33 of the male hinge shaft 3 from the locating hole 621 of the cover member 62. After disengaged the mounting portion 33 of the male hinge shaft 3 from the locating hole 621 of the cover member 62, the user can directly separate the cover member 62 and base member 61 of the flip-up electronic product 6.

Figure 8:
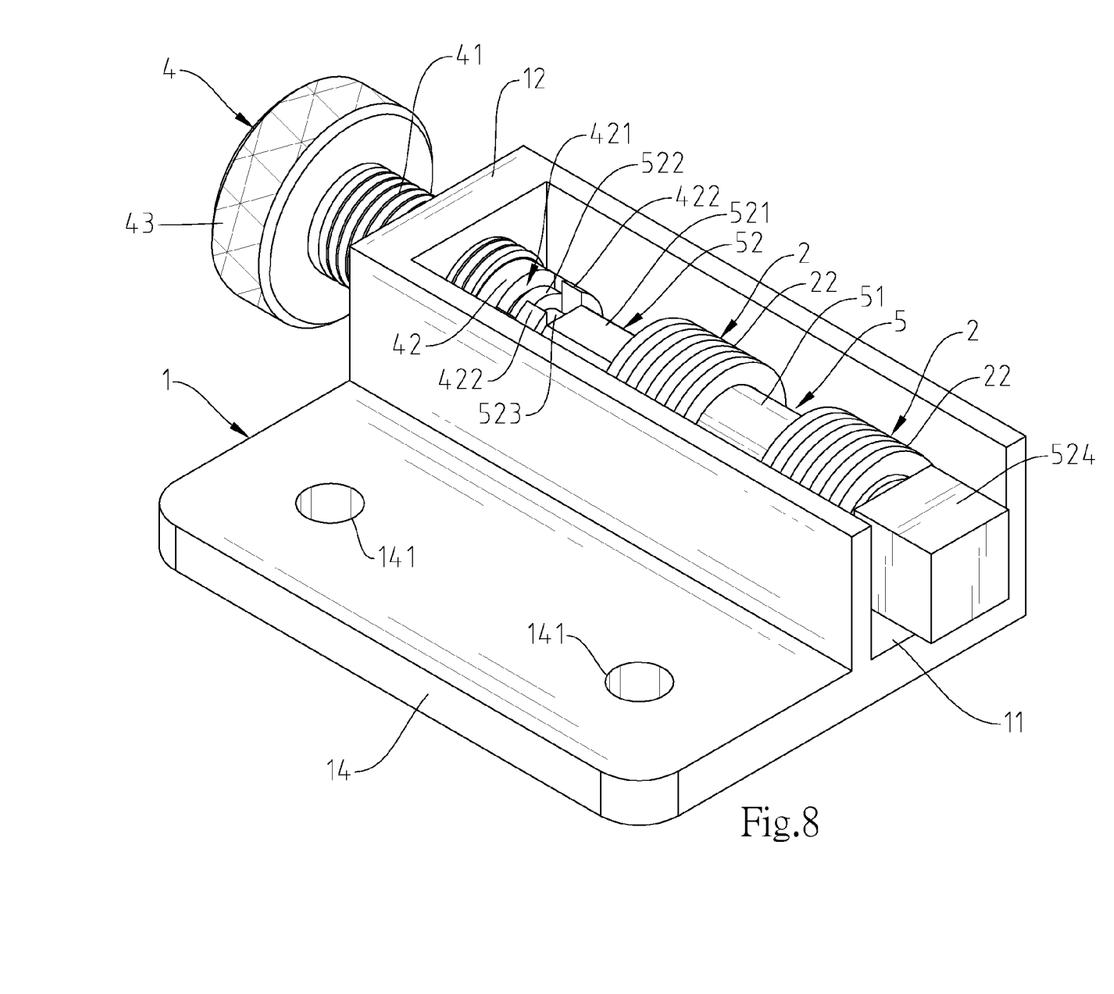
FIG. 8 is an oblique top elevational view of a hinge structure in accordance with a second embodiment of the present invention.
Figure 9:
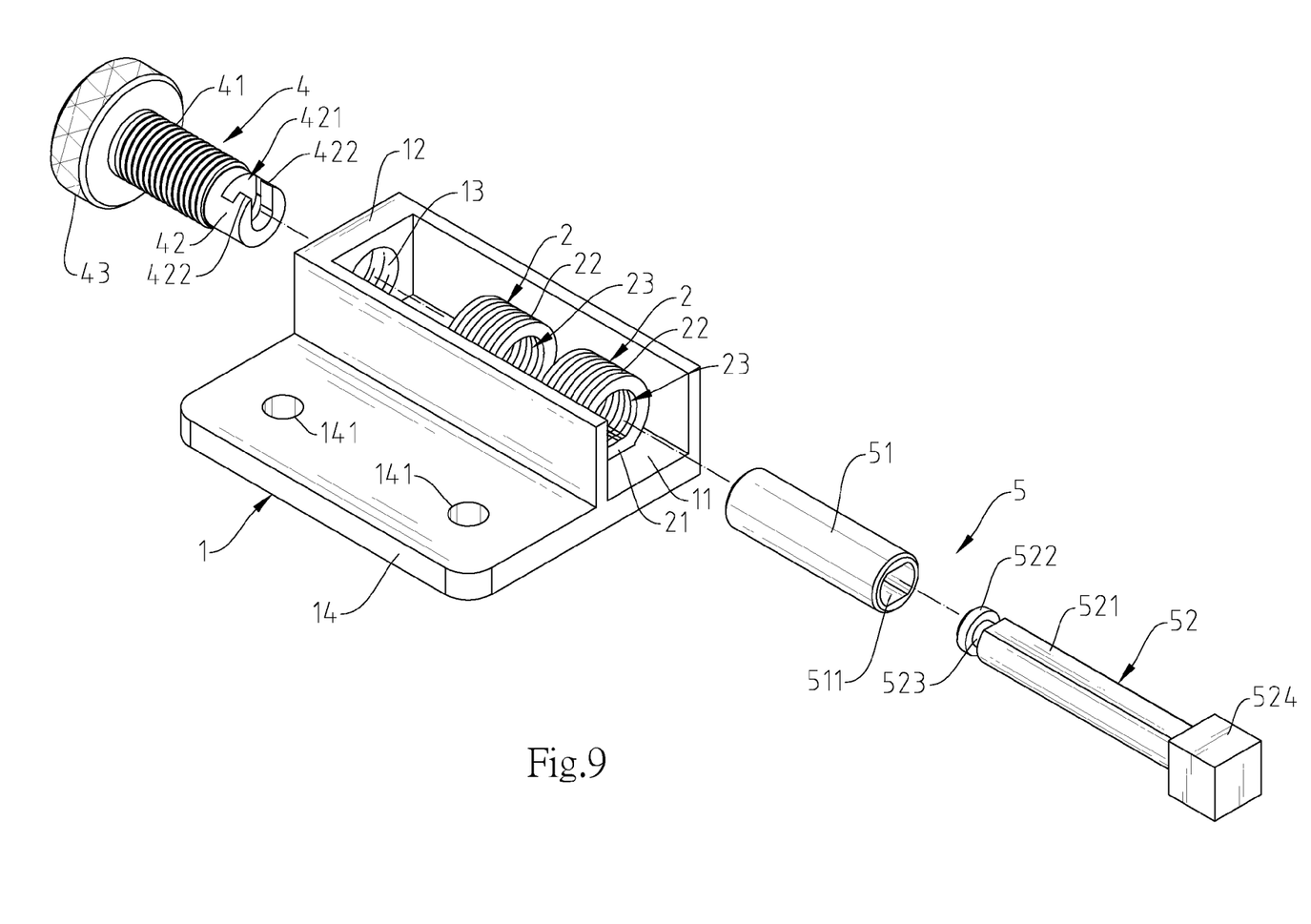
FIG. 9 is an exploded view of the hinge structure in accordance with the second embodiment of the present invention.
Figure 10:
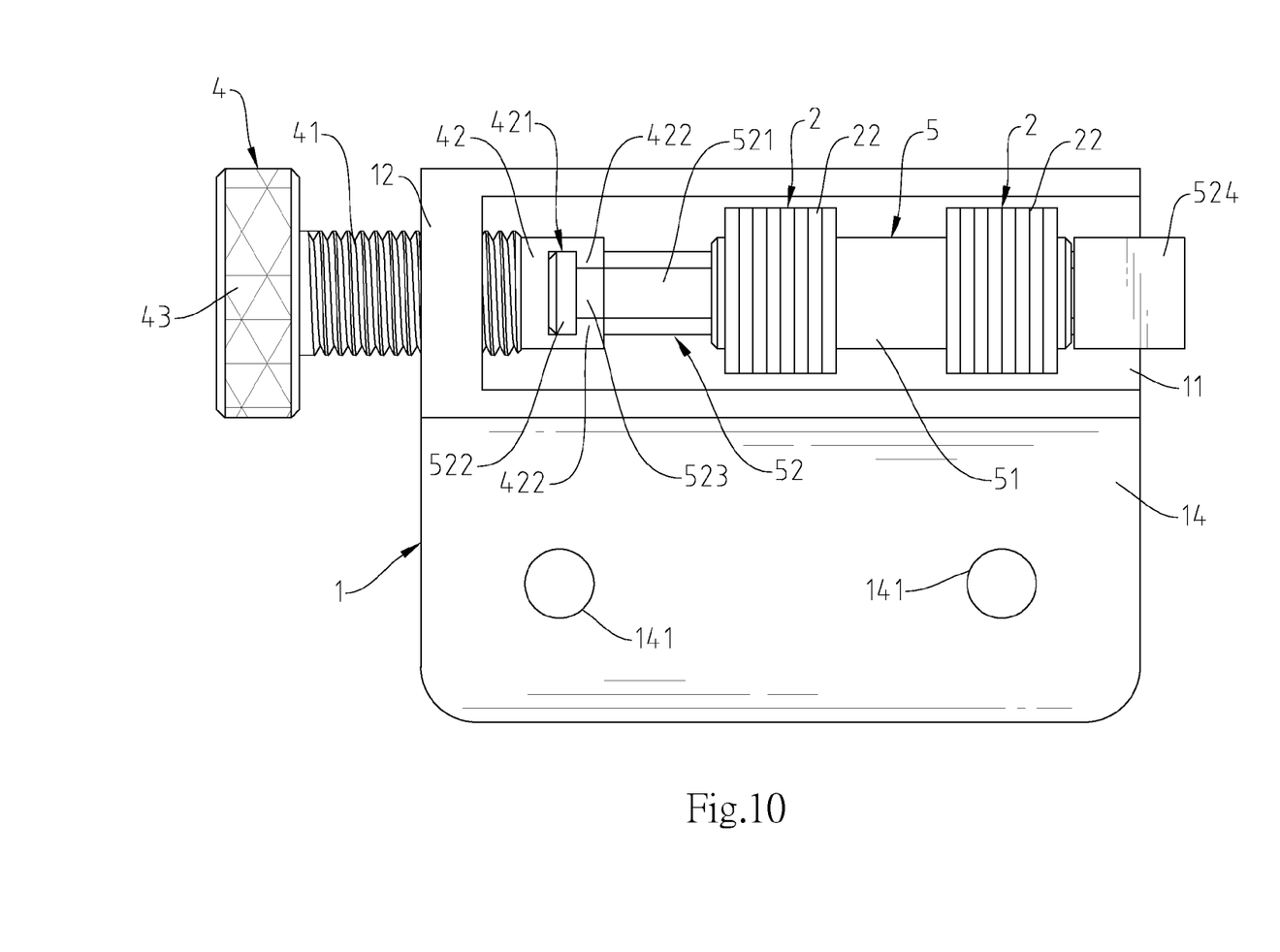
FIG. 10 is a sectional view of the hinge structure in accordance with the second embodiment of the present invention.

Referring to FIGS. 8-10, a hinge structure in accordance with a second embodiment of the present invention is shown. This second embodiment is substantially similar to the aforesaid first embodiment with the exception that the male hinge shaft 5 comprises a cylindrical shaft body 51 inserted through the shaft chamber 23 of each female hinge shaft 2 and having a non-circular coupling hole 511 axially extending through two opposing ends thereof, and a transmission rod 52 axially slidably inserted through the non-circular coupling hole 511 of the cylindrical shaft body 51. The transmission rod 52 comprises a non-circular rod body 521 inserted through the non-circular coupling hole 511 of the cylindrical shaft body 51 for allowing the cylindrical shaft body 51 to be rotated with the transmission rod 52, a mounting portion 424 located at one end of the non-circular rod body 521 and disposed outside the cylindrical shaft body 51, a connection portion 522 located at an opposite end of the non-circular rod body 521 and disposed adjacent to one end of the upright wall 12, and a position-limit groove 523 extending around the periphery thereof between the non-circular rod body 521 and the connection portion 522. Further, the connection portion 522 of the transmission rod 52 is received in the receiving trough 421 of the rotary knob 4, and the protruding portion 422 of the rotary knob 4 is coupled to the position-limit groove 523 of the transmission rod 52 of the male hinge shaft 5, enabling the actuation portion 42 of the rotary knob 4 to be coupled to the connection portion 522 of the transmission rod 52.

Figure 11:
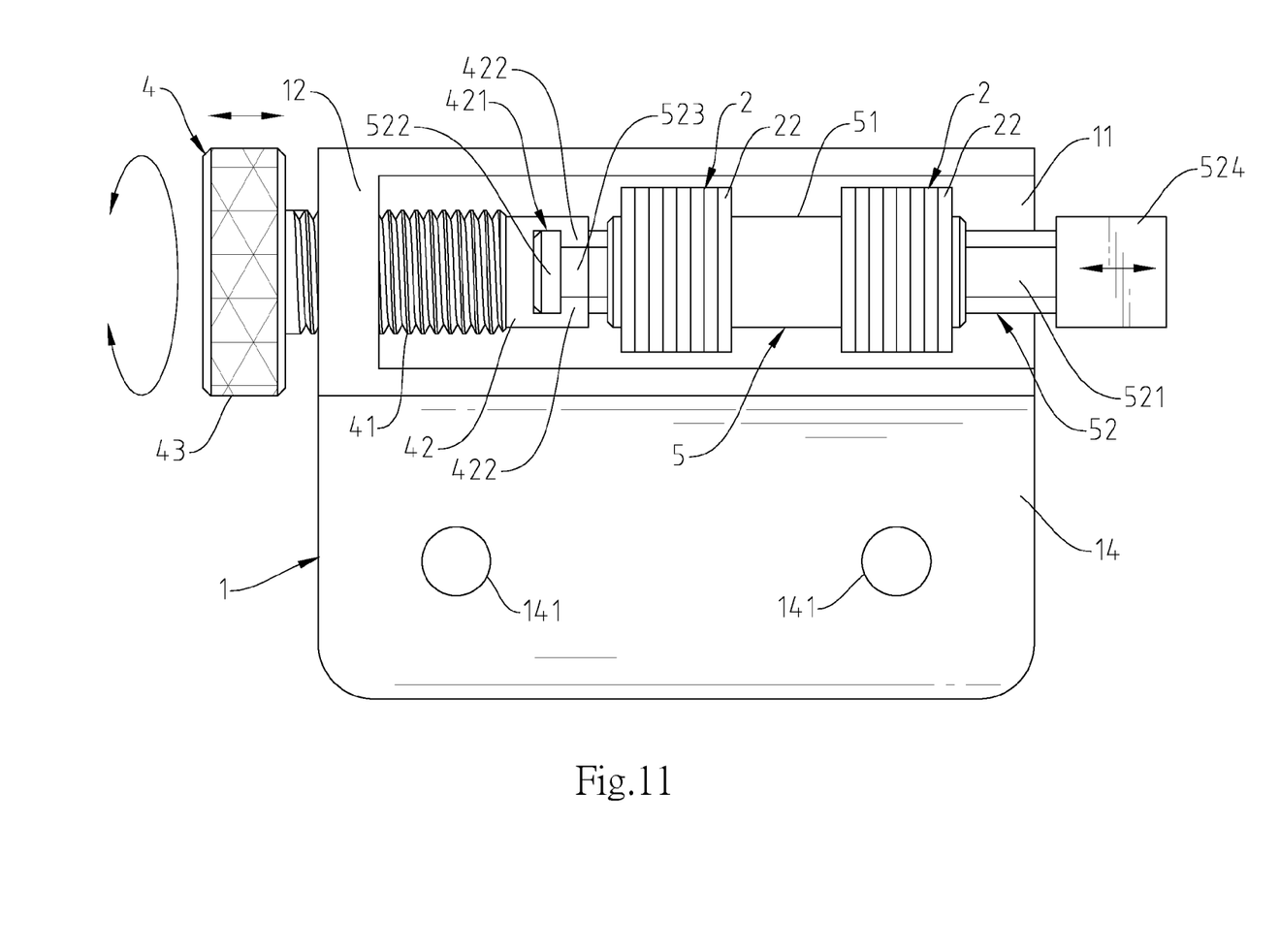
FIG. 11 is an operational view of the second embodiment of the present invention, illustrating the rotary knob rotated, the male hinge shaft moved axially relative to the female hinge shafts and the mounting base member.

Referring to FIG. 11 and FIGS. 8-10 again, in application, as illustrated, the user can operate the operating head 43 of the rotary knob 4 to rotate the threaded shank 41, moving the threaded shank 41 in direction toward or away from the mounting base member 1. When moving the threaded shank 41 in direction toward or away from the mounting base member 1, the actuation portion 42 of the rotary knob 4 will be forced to drive the connection portion 522 of the transmission 52, moving the transmission 52 in direction toward or away from the mounting base member 1.

What the invention claimed is:

1. A hinge structure, comprising: a mounting base member, said mounting base member comprising a base wall, an upright wall vertically upwardly extended from a top surface of said base wall and a screw hole located in said upright wall, a rotary knob threaded into said screw hole, a plurality of female hinge shafts fixedly mounted at the top surface of said base wall and surrounded by said upright wall, and a male hinge shaft rotatably inserted through said female hinge shafts, wherein:

said male hinge shaft comprises a cylindrical shaft body rotatably inserted through each said female hinge shaft, a connection portion located at one end of said cylindrical shaft body and disposed adjacent to said upright wall; said rotary knob comprises a threaded shank threaded into said screw hole, an actuation portion located at one end of said threaded shank and coupled to said connection portion of said male hinge shaft in such a manner that rotating said rotary knob to move said threaded shank in direction toward or away from said mounting base member causes said male hinge shaft to be moved axially in one of two reversed directions.

2. The hinge structure as claimed in claim 1, wherein each said female hinge shaft comprises a tubular shaft body defining therein an axially extending shaft chamber for the passing of said cylindrical shaft body of said male hinge shaft, and a positioning portion formed integral with the periphery of said tubular shaft body and fixedly mounted at the top surface of said base wall.

3. The hinge structure as claimed in claim 1, wherein said rotary knob further comprises a receiving trough defined in said actuation portion and adapted for receiving said connection portion of said male hinge shaft, and a protruding portion formed integral with one end of said actuation portion; said male hinge shaft further comprises a position-limit groove extending around the periphery thereof between said connection portion and said cylindrical shaft body and coupled with said protruding portion of said rotary knob.

4. The hinge structure as claimed in claim 1, wherein said male hinge shaft further comprises a mounting portion located at an opposite end of said cylindrical shaft body remote from said connection portion and disposed outside said female hinge shafts.

5. A hinge structure, comprising: a mounting base member, said mounting base member comprising a base wall, an upright wall vertically upwardly extended from a top surface of said base wall and a screw hole located in said upright wall, a rotary knob threaded into said screw hole, a plurality of female hinge shafts fixedly mounted at the top surface of said base wall and surrounded by said upright wall, and a male hinge shaft rotatably inserted through said female hinge shafts, wherein:

said male hinge shaft comprises a cylindrical shaft body inserted through the shaft chamber of each said female hinge shaft, said cylindrical shaft body comprising a non-circular coupling hole axially extending through two opposing ends thereof, and a transmission rod axially slidably inserted through said non-circular coupling hole of said cylindrical shaft body, said transmission rod comprising a non-circular rod body inserted through said non-circular coupling hole of said cylindrical shaft body for allowing said cylindrical shaft body to be rotated with said transmission rod, a connection portion located at one end of said non-circular rod body and disposed adjacent to one end of said upright wall; said rotary knob comprises a threaded shank threaded into said screw hole, an actuation portion located at one end of said threaded shank and coupled to said connection portion of said transmission rod of said male hinge shaft in such a manner that rotating said rotary knob to move said threaded shank in direction toward or away from said mounting base member causes said transmission rod of said male hinge shaft to be moved axially in one of two reversed directions.

6. The hinge structure as claimed in claim 5, wherein each said female hinge shaft comprises a tubular shaft body defining therein an axially extending shaft chamber for the passing of said cylindrical shaft body of said male hinge shaft, and a positioning portion formed integral with the periphery of said tubular shaft body and fixedly mounted at the top surface of said base wall.

7. The hinge structure as claimed in claim 5, wherein said rotary knob further comprises a receiving trough defined in said actuation portion and adapted for receiving said connection portion of said male hinge shaft, and a protruding portion formed integral with one end of said actuation portion; said transmission rod of said male hinge shaft further comprises a position-limit groove extending around the periphery thereof between said connection portion and said non-circular rod body and coupled with said protruding portion of said rotary knob.

8. The hinge structure as claimed in claim 5, wherein said transmission rod of said male hinge shaft further comprises a mounting portion located at an opposite end of said non-circular rod body remote from said connection portion and disposed outside said female hinge shafts.

\* \* \* \* \*